United States Patent
Savoy et al.

(10) Patent No.: US 9,644,654 B2
(45) Date of Patent: May 9, 2017

(54) DUAL-THREADED STEPPED SETSCREW

(71) Applicant: XEROX CORPORATION, Norwalk, CT (US)

(72) Inventors: Matthew D. Savoy, Webster, NY (US); Glenn M. Keenan, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 108 days.

(21) Appl. No.: 14/193,395

(22) Filed: Feb. 28, 2014

(65) Prior Publication Data

US 2015/0247522 A1  Sep. 3, 2015

(51) Int. Cl.
*F16B 5/02* (2006.01)
*F16B 35/00* (2006.01)

(52) U.S. Cl.
CPC .......... *F16B 5/0266* (2013.01); *F16B 5/0275* (2013.01); *F16B 35/005* (2013.01)

(58) Field of Classification Search
CPC ....... F16B 5/0275; F16B 5/0266; F16B 35/06
USPC .......................................... 411/388, 389, 393
See application file for complete search history.

(56) References Cited

U.S. PATENT DOCUMENTS

| 389,028 A * | 9/1888 | Wallace ........................ 411/389 |
| 2,132,571 A * | 10/1938 | Maney .......................... 238/304 |
| 3,093,025 A | 6/1963 | Wasserman |
| 3,424,413 A * | 1/1969 | Applegate ..................... 248/661 |
| 4,690,365 A * | 9/1987 | Miller et al. .................. 248/650 |
| 5,063,861 A * | 11/1991 | Imogawa et al. ............. 110/336 |
| 5,333,978 A * | 8/1994 | Rives ............................ 411/389 |
| 6,240,697 B1 | 6/2001 | Thompson et al. |
| 6,666,638 B2 | 12/2003 | Craven |
| 6,699,248 B2 | 3/2004 | Jackson |
| 6,763,746 B2 * | 7/2004 | Bayer et al. .................... 81/484 |
| 7,255,523 B2 | 8/2007 | Laan |
| 8,740,532 B2 * | 6/2014 | Wiebe .......................... 411/389 |
| 2012/0266422 A1 * | 10/2012 | Galota et al. ................... 24/569 |
| 2013/0280965 A1 * | 10/2013 | Kojyo .......................... 439/722 |

* cited by examiner

*Primary Examiner* — Flemming Saether
(74) *Attorney, Agent, or Firm* — Gibb & Riley, LLC

(57) ABSTRACT

Devices and methods for a setscrew device. An elongated cylindrical rod has a first threaded portion with a first diameter and a continuous spiraling thread, an unthreaded shank portion with a second diameter, and a second threaded portion having the second diameter and a continuous spiraling thread. The second diameter is smaller than the first diameter. The unthreaded shank portion is located between the first threaded portion and the second threaded portion forming a step. A bias element is disposed on the step and surrounds the second threaded portion. A compression element is threaded onto the second threaded portion and operatively connected to the bias element.

20 Claims, 5 Drawing Sheets

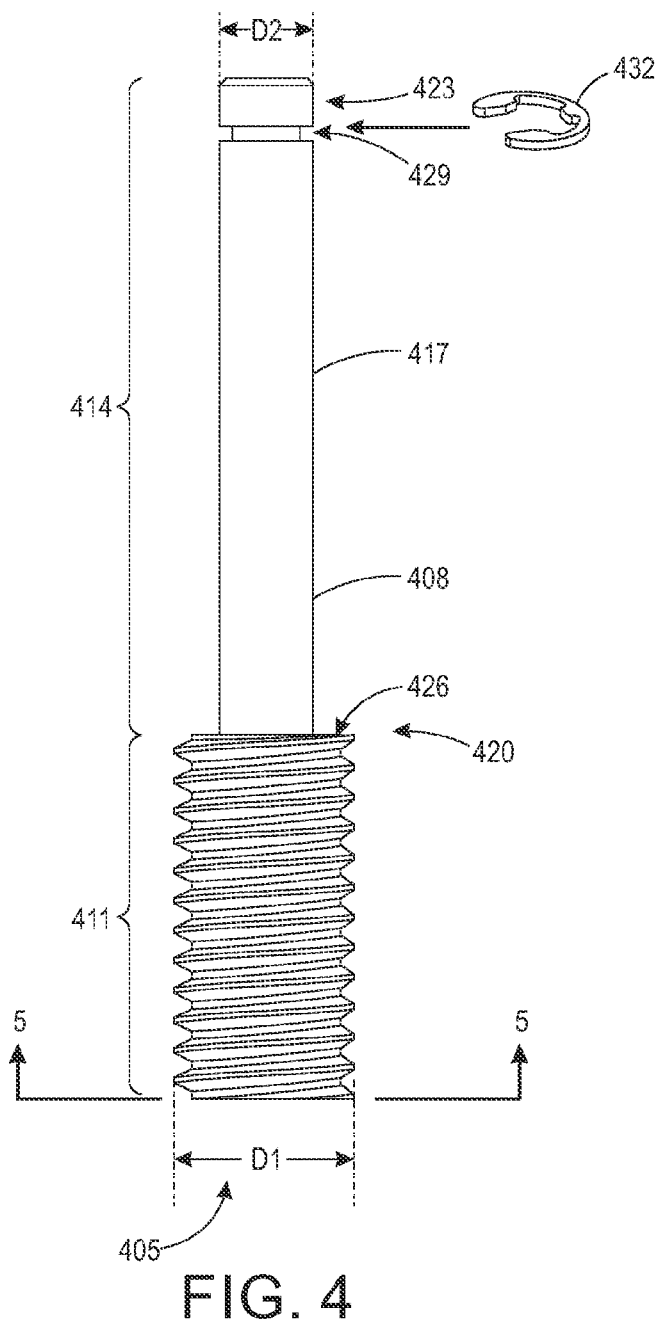
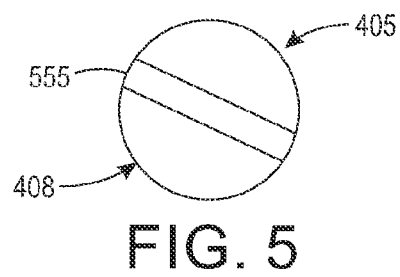
FIG. 4
FIG. 5

DUAL-THREADED STEPPED SETSCREW

BACKGROUND

Devices and methods herein generally relate to adjustment devices and, more particularly, to a setscrew used for adjustment.

Setscrews are most commonly used to secure an object within or against another object (i.e. a gear on a shaft) and prevent relative motion between the two objects. Less commonly, setscrews can also be used to precisely control the position or alignment of one object with respect to another. Setscrews work sufficiently well in this regard when motion in one direction is required. Aligning optics, however, typically requires bi-directional motion of the optic, which precludes the use of setscrews without additional hardware to provide a biasing force against the optic. Spring clips and compression springs are generally used in this regard. However, this hardware has a limited range where forces and stresses are acceptable, which may be insufficient for the required setscrew adjustment latitude. Additionally, geometric constraints may prevent the use of such hardware.

SUMMARY

Disclosed herein is a dual-threaded, stepped setscrew. The setscrew has a first end with a certain diameter and thread and a second end with a substantially smaller diameter and thread such that there is an effective step between the two ends.

According to an adjustment mechanism herein, a housing includes a moveable piece within the housing. The moveable piece comprises a tab having a slot. The mechanism includes an elongated cylindrical rod comprising a first threaded portion having a first diameter comprising a continuous spiraling thread. The first threaded portion is connected to a threaded aperture in the housing. The elongated cylindrical rod includes an unthreaded shank portion having a second diameter and a second threaded portion having the second diameter comprising a continuous spiraling thread. The second diameter is different from the first diameter. The unthreaded shank portion is located between the first threaded portion and the second threaded portion forming a step. The unthreaded shank portion and the second threaded portion pass through the slot in the tab, which rests on the step. A bias element surrounds the second threaded portion and contacts the tab. A compression element is on the second threaded portion and contacts the bias element.

According to another adjustment mechanism herein, a housing includes a moveable piece within the housing. The moveable piece comprises a tab having a slot. The mechanism includes an elongated cylindrical rod comprising a first portion having a first diameter. The first portion comprises a continuous spiraling thread. The first portion is connected to a threaded aperture in the housing. The elongated cylindrical rod includes a second portion having a second diameter. The second diameter is different from the first diameter. The second portion comprises an unthreaded shank having a first end and a second end. A step is located at the first end of the unthreaded shank between the first portion and the second portion. The unthreaded shank passes through the slot in the tab. The tab rests on the step. A bias element surrounds the second portion and contacts the tab. A groove is located at the second end of the unthreaded shank. A retaining ring is in the groove and contacts the bias element.

According to a setscrew device herein, an elongated cylindrical rod comprises a first threaded portion having a first diameter comprising a continuous spiraling thread, an unthreaded shank portion having a second diameter, and a second threaded portion having the second diameter comprising a continuous spiraling thread. The second diameter is smaller than the first diameter. The unthreaded shank portion is located between the first threaded portion and the second threaded portion forming a step. A bias element surrounds the second threaded portion and contacts the step. A compression element is on the second threaded portion and contacts the bias element.

These and other features are described in, or are apparent from, the following detailed description.

BRIEF DESCRIPTION OF THE DRAWINGS

Various examples of the devices and methods are described in detail below, with reference to the attached drawing figures, which are not necessarily drawn to scale and in which:

FIG. 4 is a side view of a setscrew device according to devices and methods herein;

FIG. 5 is an end view of the setscrew taken along line 5-5 of FIG. 4;

DETAILED DESCRIPTION

Figure 1:
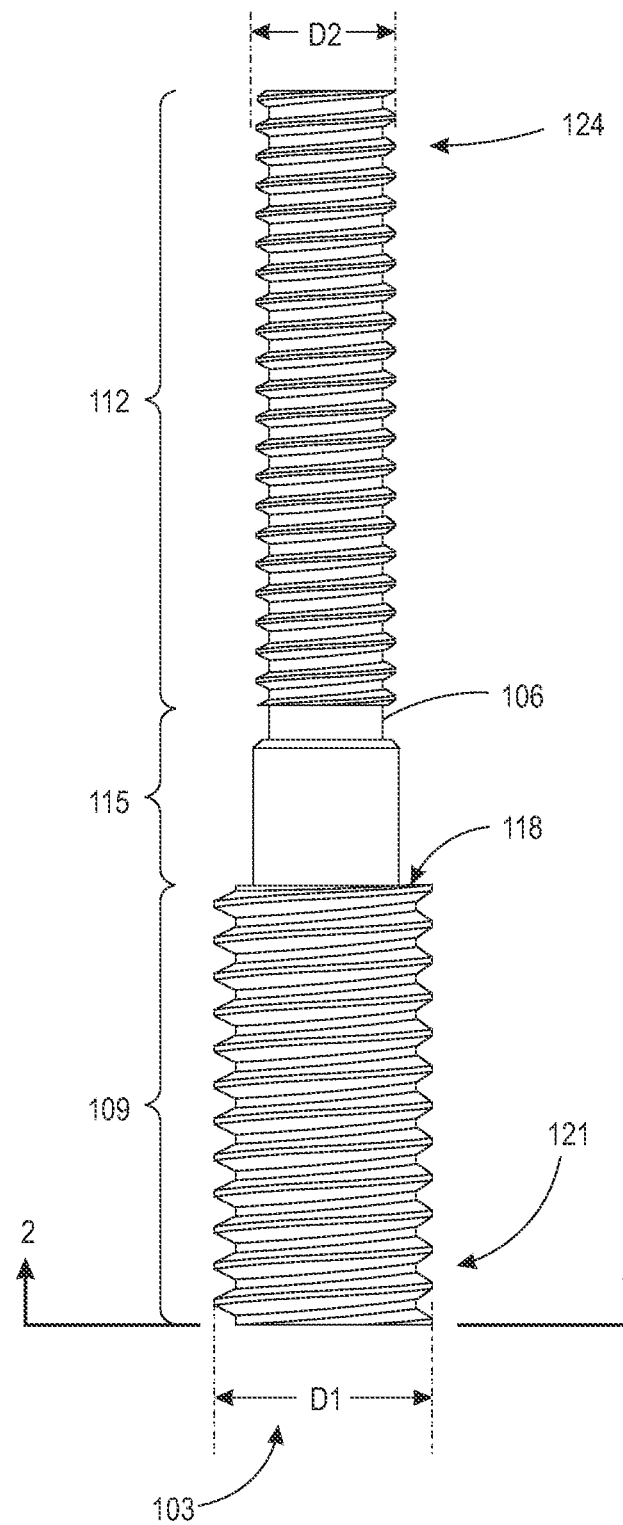
FIG. 1 is a side view of a setscrew device according to devices and methods herein.

The disclosure will now be described by reference to a dual-threaded, stepped setscrew that enables bi-directional motion of an object with an integrated biasing member. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

According to devices and methods herein, a dual-threaded, stepped setscrew has a first end with a certain diameter and thread and a second end with a substantially smaller diameter and thread such that there is an effective step between the two ends.

Referring to the drawings, FIG. 1 shows a setscrew device, indicated generally as 103, according to devices and methods herein. The setscrew 103 comprises an elongated cylindrical rod 106. The elongated cylindrical rod 106 has a first threaded portion 109. The first threaded portion 109 has a continuous spiraling thread. The diameter of the first threaded portion 109 may be a certain diameter, indicated as D1. The elongated cylindrical rod 106 also has a second threaded portion 112. The second threaded portion 112 has a continuous spiraling thread. The diameter of the second threaded portion 112 may be a certain diameter, indicated as D2. Diameter D2 is smaller than diameter D1. An unthreaded shank portion 115 is located between the first threaded portion 109 and the second threaded portion 112, effectively forming a step 118 between the two ends. According to devices and methods herein, the pitch of the thread on the first threaded portion 109 may be different from the pitch of the thread on the second threaded portion 112. According to devices and methods herein, the setscrew 103 is headless (also called blind), meaning that the setscrew 103 is fully threaded in the first threaded portion 109 and has no head at the first end 121 that would project past the diameter D1 of the first threaded portion 109.

Figure 2:
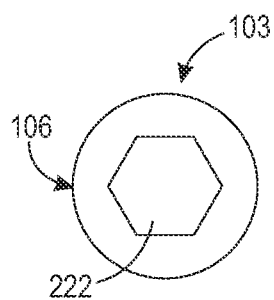
FIG. 2 is an end view of the setscrew taken along line 2-2 of FIG. 1.
Figure 3:
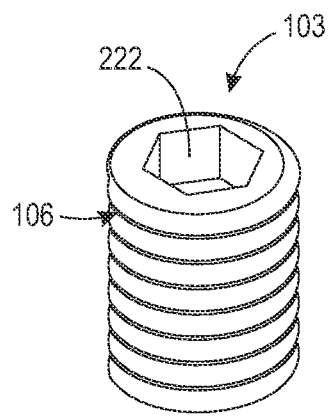
FIG. 3 is an isometric view of a portion of an end of the setscrew device of FIG. 1.

FIG. 2 is an end view of the setscrew 103. FIG. 3 is an isometric view of a portion of the first end 121 of the setscrew 103. According to devices and methods herein, the setscrew 103 may include a hexagonal socket 222 for an Allen key, or other shape, such as a star (Torx), square socket (Robertson), or slot for an appropriate device, in order to effectively rotate the setscrew 103. The setscrew 103 may also include a hexagonal socket 222 or other appropriate shape in the second end 124 of the setscrew 103.

FIG. 4 shows another setscrew device, indicated generally as 405, according to devices and methods herein. The setscrew 405 comprises an elongated cylindrical rod 408. The elongated cylindrical rod 408 has a first portion 411 and a second portion 414. According to devices and methods herein, the diameter of the first portion 411 may be a certain diameter, indicated as D1. The first portion 411 comprises a continuous spiraling thread. The second portion 414 comprises an unthreaded shank 417 having a first end 420 and a second end 423. The diameter of the second portion 414 may be a certain diameter, indicated as D2. Diameter D2 is smaller than diameter D1. A step 426 is located at the first end 420 of the unthreaded shank 417 between the first portion 411 and the second portion 414. A groove 429 is located at the second end 423 of the unthreaded shank 417. A retaining ring 432 may be disposed in the groove 429.

FIG. 5 is an end view of the setscrew 405. According to devices and methods herein, the setscrew 405 may include a slot 555 or other shape, such as a hexagonal socket 222 (Allen), a star (Torx), square socket (Robertson), for an appropriate device, in order to effectively rotate the setscrew 405.

Figure 6:
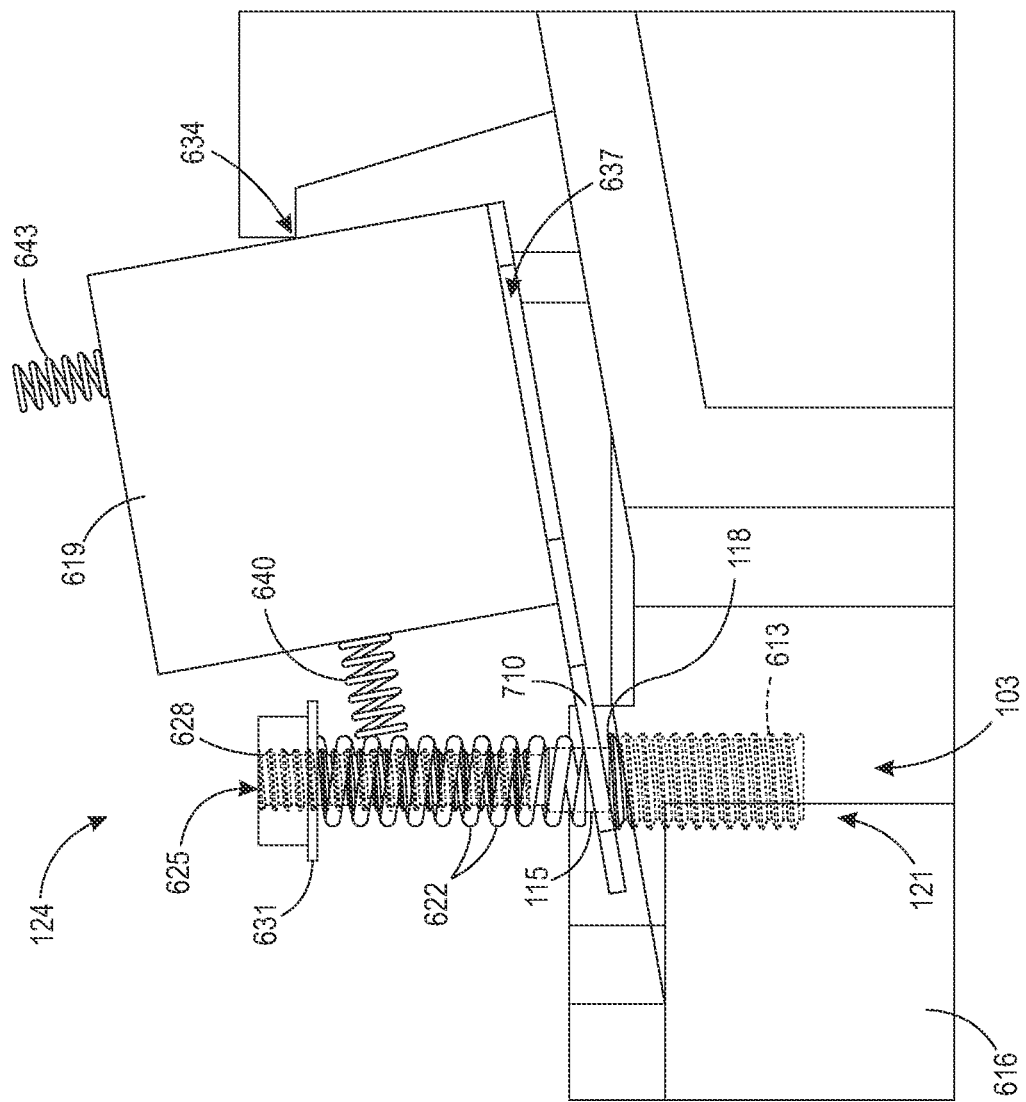
FIG. 6 is a side view of an adjustment mechanism according to devices and methods herein.
Figure 7:
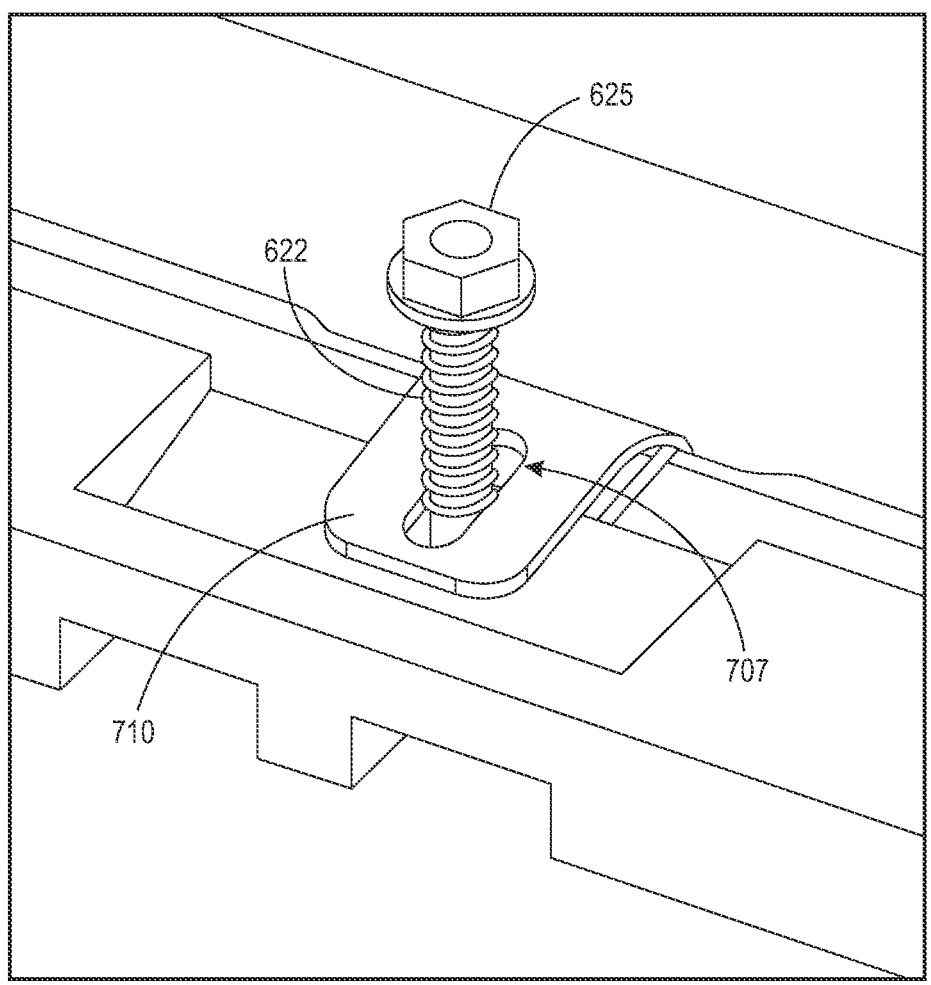
FIG. 7 is a perspective view of a portion of an adjustment mechanism according to devices and methods herein.

Referring now to FIGS. 6 and 7, the first end 121 of the setscrew 103 may be threaded into a threaded aperture 613 in a housing 616 with the step 118 and the second end 124 extending away from the housing 616 outside the threaded aperture 613. The second end 124 of the setscrew 103, including the unthreaded shank portion 115 and the second threaded portion 112, may pass through a slot 707 in a tab 710 of a moveable piece 619 whose motion relative to the housing 616 is desired. The tab 710 rests on the step 118. A bias element 622, such as a compression spring, may be concentrically disposed over the diameter D2 of the second end 124 of the setscrew 103. The bias element 622 may comprise a spring, a band, a gas piston, arched elements, or other appropriate devices known in the art. The bias element 622 is disposed on the tab 710. In some cases, the bias element 622 surrounds the second threaded portion 112 and at least a portion of the unthreaded shank portion 115.

In some examples, a compression element 625, such as a nut 628 and washer 631, may be threaded onto the second threaded portion 112 and operatively connected to the bias element 622. The inside diameter of the bias element 622 is large enough to slide over the diameter D2 of the second end 124 of the setscrew 103. The outside diameter of the bias element 622 is only restricted in size such that the nut 628 and washer 631 effectively captures the bias element 622. The compression element 625 may be threaded onto the second end 124 of the setscrew 103 to a certain position until a desired biasing force is achieved.

In some examples, the bias element 622, such as a compression spring, may be concentrically disposed over the diameter D2 of the second end 423 of the setscrew 405. The bias element 622 is disposed on the tab 710 and surrounds the unthreaded shank 417. In such a case, the bias element 622 is held in place by the retaining ring 432 disposed in groove 429 (and washer, if required). As described above, the inside diameter of the bias element 622 is large enough to slide over the diameter D2 of the second end 124 of the setscrew 405. The outside diameter of the bias element 622 is only restricted in size such that the retaining ring 432 (and washer, if required) effectively captures the bias element 622.

According to devices and methods herein, the first end 121, having a slot 555, a hexagonal socket 222, or other shape, could be adjusted to effectively translate or rotate the moveable piece 619 relative to the housing 616. As the setscrew 103 is moved into or out of the housing 616, the moveable piece 619 may be caused to rotate about one or more pivot points, such as 634, 637. Throughout the adjustment range, the bias element 622 delivers a constant biasing force to the tab 710 against the step 118 of the setscrew 103. Compression element 625 allows for more adjustability and fine-tuning of the biasing force than the retaining ring 432, if required. Additional spring devices 640, 643 maintain the moveable piece 619 biased against the right side and bottom pivot points/supports 634, 637, respectively. Movement of the setscrew 103 into and out of the housing 616 causes relative motion of the moveable piece 619 about the pivot point 63 and/or 637.

According to an adjustment mechanism herein, a housing 616 includes a moveable piece 619 within the housing 616. The moveable piece 619 comprises a tab 710 having a slot 707. The mechanism includes an elongated cylindrical rod 106 comprising a first threaded portion 109 having a first diameter D1 comprising a continuous spiraling thread. The first threaded portion 109 is operatively connected to the threaded aperture 613 in the housing 616. The elongated cylindrical rod 106 includes an unthreaded shank portion 115 having a second diameter D2 and a second threaded portion 112 having the second diameter D2 comprising a continuous spiraling thread. The second diameter D2 is smaller than the first diameter D1. The unthreaded shank portion 115 is located between the first threaded portion 109 and the second threaded portion 112 forming a step 118. The unthreaded shank portion 115 and the second threaded portion 112 pass through the slot 707 in the tab 710. The tab 710 rests on the step 118. A bias element 622 is disposed on the tab 710 and surrounds the second threaded portion 112. A compression element 625 is threaded onto the second threaded portion 112 and operatively connected to the bias element 622.

According to devices and methods herein, the setscrew 103 is of sufficient length such that the first end 121 can be captured within the threaded aperture 613 in the housing 616 and the second end 124 effectively extends past the tab 710 of the moveable piece 619 whose motion is desired such that bias element 622 and compression element 625 can be coupled to the tip of the second end 124.

The adjustment mechanism described herein may be used for adjusting an optical mirror in a raster output scanner (ROS). For example, the adjustment mechanism described herein can utilize setscrews to position and provide alignment of optics such that a precise laser beam can be emitted from the ROS. The adjustment mechanism can use a setscrew style mechanism that has a secondary threaded end in a reduced diameter to house a compression spring. The compression spring biases the mirror against the setscrew so that as the screw is adjusted up or down the mirror moves with it, by rotating around a pivot point. Without the spring, the mirror may become wedged in the housing and may not travel with the setscrew. The spring being mounted to the same dual-threaded setscrew provides consistent spring force regardless of how the setscrew is adjusted.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

What is claimed is:

1. An adjustment mechanism, comprising:
   a housing having a threaded aperture;
   a moveable piece connected to said housing, said moveable piece comprising a tab having a slot, said slot comprising an elongated aperture having a length dimension and a width dimension perpendicular to said length dimension, said length dimension being greater than said width dimension;
   an elongated cylindrical rod extending through said slot and being connected to said threaded aperture, said elongated cylindrical rod comprising:
      a first threaded portion having a first diameter comprising a continuous spiraling thread, said first threaded portion being connected to said threaded aperture in said housing;
      an unthreaded shank portion having a second diameter, said second diameter being smaller than said first diameter; and
      a second threaded portion having said second diameter comprising a continuous spiraling thread,
      said unthreaded shank portion being between said first threaded portion and said second threaded portion,
      said first diameter of said first threaded portion being larger than said second diameter of said unthreaded shank portion forming a step where said first threaded portion meets said unthreaded shank portion, and
      said second diameter being about the same size as said width dimension of said slot and said first diameter being larger than said width dimension of said slot allowing said unthreaded shank portion and said second threaded portion to pass through said slot in said tab and preventing said first threaded portion and said step from passing through said slot, such that said tab rests on said step;
   a bias element surrounding said second threaded portion and contacting said tab; and
   a compression element on second threaded portion, said compression element contacting said bias element.

2. The adjustment mechanism according to claim 1, said first threaded portion having a different threaded pitch than said second threaded portion.

3. The adjustment mechanism according to claim 1, said bias element comprising one of:
   a spring,
   a band,
   a gas piston, and
   an arched element.

4. The adjustment mechanism according to claim 1, said compression element comprising:
   a nut having threads contacting threads of said second threaded portion, and
   a washer contacting said bias element between said bias element and said nut.

5. The adjustment mechanism according to claim 1, said compression element being positioned to provide a desired biasing force to said tab.

6. The adjustment mechanism according to claim 1, said elongated cylindrical rod further comprising a first end and a second end, at least one of said first end and said second end further comprising one of a socket and a slot for rotating said elongated cylindrical rod.

7. The adjustment mechanism according to claim 1, said elongated cylindrical rod being adjustable relative to said housing, said housing further comprising a pivot point, and said moveable piece contacting said pivot point, movement of said elongated cylindrical rod into and out of said housing causing relative motion of said moveable piece about said pivot point.

8. A setscrew device, comprising:
a moveable piece having a slot, said slot comprising an elongated aperture having a length dimension and a width dimension perpendicular to said length dimension, said length dimension being greater than said width dimension; and
an elongated cylindrical rod extending through said slot, said elongated cylindrical rod comprising:
a first threaded portion having a first diameter comprising a continuous spiraling thread;
an unthreaded shank portion having a second diameter, said second diameter being smaller than said first diameter; and
a second threaded portion having said second diameter comprising a continuous spiraling thread,
said unthreaded shank portion being between said first threaded portion and said second threaded portion,
said first diameter of said first threaded portion being larger than said second diameter of said unthreaded shank portion forming a step where said first threaded portion meets said unthreaded shank portion,
said second diameter being about the same size as said width dimension of said slot and said first diameter being larger than said width dimension of said slot allowing said unthreaded shank portion and said second threaded portion to pass through said slot and preventing said first threaded portion and said step from passing through said slot, such that said moveable piece contacts said step,
a bias element surrounding said second threaded portion; and
a compression element on second threaded portion, said compression element contacting said bias element.

9. The setscrew device according to claim 8, said first threaded portion having a different threaded pitch than said second threaded portion.

10. The setscrew device according to claim 8, said elongated cylindrical rod further comprising a first end and a second end, at least one of said first end and said second end further comprising one of a socket and a slot for rotating said elongated cylindrical rod.

11. The setscrew device according to claim 8, said bias element comprising one of:
a spring,
a band,
a gas piston, and
an arched element.

12. The setscrew device according to claim 8, said compression element comprising:
a nut having threads contacting threads of said second threaded portion, and
a washer on said second threaded portion between said bias element and said nut.

13. The setscrew device according to claim 8, said bias element being between said moveable piece and said compression element.

14. An adjustment mechanism, comprising:
a housing having a threaded aperture;
a moveable piece connected to said housing, said moveable piece has a slot, said slot comprising an elongated aperture having a length dimension and a width dimension perpendicular to said length dimension, said length dimension being greater than said width dimension;
a rod having a first threaded portion connected to said threaded aperture, said rod extends through said slot and connects said moveable piece to said housing;
a compression element connected to a second threaded portion of said rod opposite said first threaded portion; and
a bias element surrounding said second threaded portion of said rod and contacting said moveable piece and said compression element,
said rod comprises an unthreaded portion between said first threaded portion and said second threaded portion,
said first threaded portion has a relatively larger diameter than a relatively smaller diameter of said second threaded portion and said unthreaded portion, and a step in said rod exists where said relatively larger diameter of said first threaded portion meets said relatively smaller diameter of said unthreaded portion,
said relatively smaller diameter is about the same size as said width dimension of said slot and said relatively larger diameter is larger than said width dimension of said slot, to allow said unthreaded portion and said second threaded portion to pass through said slot and prevent said first threaded portion from passing through said slot, and to have said moveable piece contact said step in said rod, and
said moveable piece is biased against said step in said rod by said bias element.

15. The adjustment mechanism according to claim 14, said first threaded portion and said second threaded portion have different threaded pitches.

16. The adjustment mechanism according to claim 14, said bias element comprises a spring, a band, a gas piston, or an arched element.

17. The adjustment mechanism according to claim 14, said compression element comprises a nut having threads contacting threads of said second threaded portion, and a washer contacting said bias element between said bias element and said nut.

18. The adjustment mechanism according to claim 14, said compression element is positioned to provide a force to bias said bias element against said moveable piece.

19. The adjustment mechanism according to claim 14, said rod further comprises a socket or a second slot for rotating said rod.

20. The adjustment mechanism according to claim 14, said rod is moveable relative to said housing, said housing further comprises a pivot point, said moveable piece contacts said pivot point, and movement of said rod into and out of said housing causes relative motion of said moveable piece about said pivot point.

* * * * *